United States Patent
Chen et al.

(10) Patent No.: US 11,550,624 B2
(45) Date of Patent: Jan. 10, 2023

(54) METHOD, DEVICE, AND COMPUTER PROGRAM PRODUCT FOR EXECUTING A JOB IN AN APPLICATION SYSTEM

(71) Applicant: EMC IP Holding Company LLC, Hopkinton, MA (US)

(72) Inventors: Jet Chen, Beijing (CN); Bing Liu, Tianjin (CN); Wei Lin, Beijing (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 300 days.

(21) Appl. No.: 16/885,670

(22) Filed: May 28, 2020

(65) Prior Publication Data
US 2021/0216364 A1   Jul. 15, 2021

(30) Foreign Application Priority Data
Jan. 13, 2020   (CN) .......................... 202010031440.9

(51) Int. Cl.
| | |
|---|---|
| G06F 12/00 | (2006.01) |
| G06F 9/48 | (2006.01) |
| G06F 9/4401 | (2018.01) |
| G06F 12/02 | (2006.01) |
| G06F 11/14 | (2006.01) |
| G06F 9/54 | (2006.01) |

(52) U.S. Cl.
CPC .......... *G06F 9/4881* (2013.01); *G06F 9/4403* (2013.01); *G06F 9/546* (2013.01); *G06F 11/1461* (2013.01); *G06F 12/0253* (2013.01)

(58) Field of Classification Search
None
See application file for complete search history.

(56) References Cited

U.S. PATENT DOCUMENTS

2017/0090988 A1* 3/2017 Young .................. G06F 9/5094

* cited by examiner

*Primary Examiner* — Daniel D Tsui
(74) *Attorney, Agent, or Firm* — Womble Bond Dickinson (US) LLP (57) ABSTRACT

The present disclosure relates to a method, device and computer program product for executing a job in an application system. Here, the application system comprises a first processing device and a second processing device, and a first response speed of the first processing device being lower than a second response speed of the second processing device. In a method, a job request is received from a user of the application system, the job request specifying that the job is to be executed in the application system; a job type of the job is determined, the job type describing a requirement of the user on a response speed for executing the job; a target processing device is selected from the first processing device and the second processing device in accordance with determining that the job type relates to a high response speed; and the job is assigned to the selected target processing device, so that the job is executed by the target processing device. By means of the above method, a processing device for processing a job is selected based on the type of the job, and further processing devices in the application system may be dispatched more effectively. Furthermore, there is provided a corresponding device and computer program product.

20 Claims, 8 Drawing Sheets

METHOD, DEVICE, AND COMPUTER PROGRAM PRODUCT FOR EXECUTING A JOB IN AN APPLICATION SYSTEM

CROSS-REFERENCE TO RELATED APPLICATION

This patent application claims priority, under 35 U.S.C. § 119, of Chinese Patent Application No. 202010031440.9, filed Jan. 13, 2020, which is incorporated by reference in its entirety.

FIELD

Various implementations of the present disclosure relate to job management, and more specifically, to a method, device and computer program product for executing a job in an application system.

BACKGROUND

With the development of application systems, various types of application systems have emerged. A user of an application system may perform various types of tasks in the application system. For example, regarding an application system for backup, a user of the application system may back up his/her own user application at different time points. Subsequently, in a backup job submitted to the application system, a backup copy may be transmitted to the application system. In another example, the user may further submit a recovery job to the application system, so that data that has been backed up may be retrieved from the application system for recovering the user system to the retrieved data.

Technical solutions have been proposed to deploy a dedicated processing device in an application system for assisting a general-purpose processing device and further increasing a speed of job execution. However, a workload of the dedicated processing device may not be stable, and sometimes may result in larger latency and further lead to processing inefficiency of the application system. Therefore, how to more effectively execute various jobs from users has become a focus of research.

SUMMARY

Therefore, it is desirable to develop and implement a technical solution for executing a job in an application system more effectively. It is desired that the technical solution may be compatible with existing applications systems and a job may be executed more effectively by reconstructing configurations of existing application systems.

According to a first aspect of the present disclosure, a method is provided for executing a job in an application system. Here, the application system comprises a first processing device and a second processing device, and a first response speed of the first processing device being lower than a second response speed of the second processing device. In the method, a job request is received from a user of the application system, the job request specifying that the job is to be executed in the application system. A job type of the job is determined, the job type describing a requirement of the user on a response speed for executing the job. A target processing device is selected from the first processing device and the second processing device in accordance with determining that the job type relates to a high response speed. The job is assigned to the selected target processing device, so that the job is executed by the target processing device.

According to a second aspect of the present disclosure, an electronic device is provided, the electronic device comprising: at least one processor; and a memory coupled to the at least one processor, the memory having instructions stored thereon, the instructions, when executed by the at least one processor, causing the device to perform acts for executing a job in an application system. The application system comprises a first processing device and a second processing device, and a first response speed of the first processing device being lower than a second response speed of the second processing device. The acts comprise: receiving a job request from a user of the application system, the job request specifying that the job is to be executed in the application system; determining a job type of the job, the job type describing a requirement of the user on a response speed for executing the job; selecting a target processing device from the first processing device and the second processing device in accordance with determining that the job type relates to a high response speed; and assigning the job to the selected target processing device, so that the job is executed by the target processing device.

According to a third aspect of the present disclosure, a computer program product is provided. The computer program product is tangibly stored on a non-transitory computer-readable medium and comprises machine-executable instructions which are used to implement a method according to the first aspect of the present disclosure.

BRIEF DESCRIPTION OF THE DRAWINGS

Through a more detailed description in the accompanying drawings, features, advantages and other aspects of the implementations, the present disclosure will become more apparent. Several implementations of the present disclosure are illustrated schematically and are not intended to limit the present invention. In the drawings.

DETAILED DESCRIPTION OF IMPLEMENTATIONS

The preferred implementations of the present disclosure will be described in more detail with reference to the drawings. Although the drawings illustrate the preferred implementations of the present disclosure, it should be appreciated that the present disclosure can be implemented in various ways and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text can also comprise other explicit and implicit definitions.

Various types of application systems have emerged in different application environments. For the sake of description, a storage system will only be used as an example of application systems. It will be understood that application systems may further be a storage system, a communication system, an e-mail system, a multimedia service system, etc.

It will be understood that a general-purpose processing device such as a general-purpose processor (CPU) may be deployed in an application system. Besides general-purpose processing devices, dedicated processing devices have been developed. For example, QuickAssist Technology (QAT) has been proposed to use an accelerator to optimize the performance of the application system. QAT-based processing devices may improve some processing performance (e.g., compression, encryption, decryption, etc.) and reduce the power consumption at the same time. Besides traditional general-purpose processing devices, QAT-based processing devices may be used to process some specific types of jobs in an application system so as to improve the overall performance of the application system.

Figure 1:
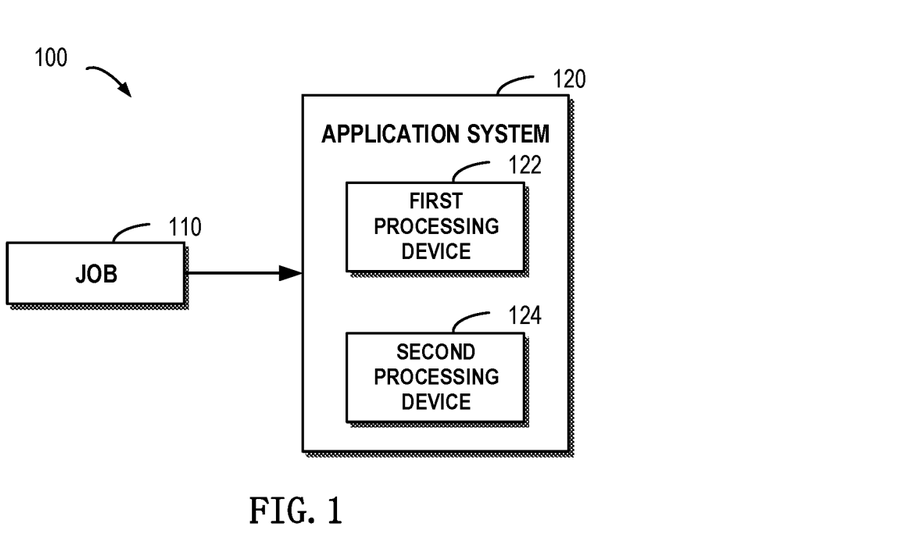
FIG. 1 schematically shows a block diagram of an application environment in which example implementations of the present disclosure may be implemented.

FIG. 1 schematically shows a block diagram of an application environment 100 in which example implementations of the present disclosure may be implemented. As depicted, an application system 120 may comprise a first processing device 122 and a second processing device 124. Here, the application system 120 may be, for example, a backup system, and a user may back up data to the application system 120 and retrieve data from the application system 120 for recovery. The first processing device 122 may be, for example, a QAT-based processing device, which may execute jobs from the user. The second processing device 124 may be, for example, a processing device based on a general-purpose processor, which may execute various jobs inside the application system 120.

The general-purpose processor has a higher response speed and may process various types of jobs, so the general-purpose processor is often busy processing various jobs and has a heavier workload. A QAT-based dedicated processing device has been proposed to be deployed in the application system 120 so as to share workloads of the general-purpose processor. For example, a job 110 from the application system 120 may be assigned to the first processing device 122 and executed by the first processing device 122. Although the first processing device 122 may process the job 110 in place of the second processing device 124, the first processing device 122 may be faced with a higher workload. As a result, the job 110 perhaps has to queue up and wait for being processed by the first processing device 122. At this point, it has become a focus of research on how to improve the efficiency that the application system 120 executes the job 110.

In order to overcome drawbacks in the above technical solutions, example implementations of the present disclosure propose a technical solution for selecting a processing device for executing a job based on a job type of the job. First, a brief description is presented below for example implementations of the present disclosure with reference to FIG. 2. This figure schematically shows a block diagram 200 of a procedure for executing a job in an application system according to example implementations of the present disclosure. As shown by an arrow 220 in FIG. 2, first a job type 210 of the job 110 may be determined, and the first processing device 122 or the second processing device 124 may be selected as a target processing device from the application system 120 based on the job type 210. Subsequently, the job 110 may be assigned to the selected target processing device. For example, as shown by an arrow 222, the first processing device 122 may be selected based on the job type 210. As shown by an arrow 224, the job 110 may be assigned to the selected first processing device 122.

Figure 2:
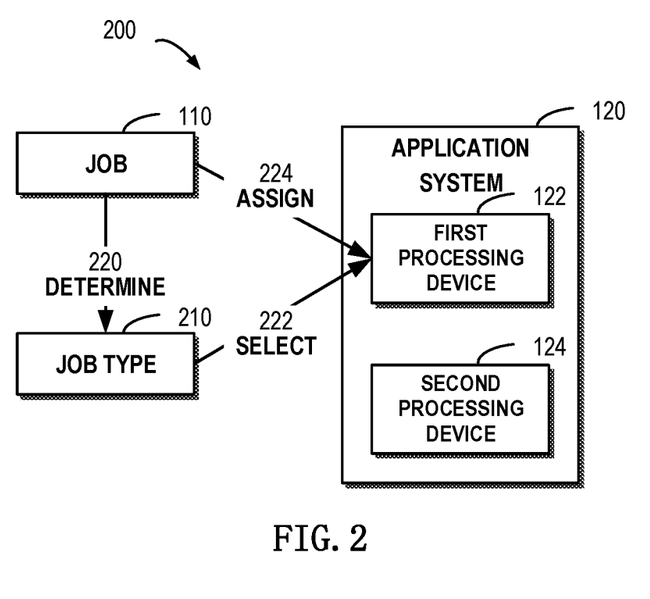
FIG. 2 schematically shows a block diagram of a procedure for executing a job in an application system according to example implementations of the present disclosure.

It will be understood that the job 110 may comprise, e.g., a backup job, a recovery job, a copy job, a garbage collection job, etc. Different jobs have different requirements on response speeds. For example, the backup job may require to be executed within a specified time period (e.g., at night) and thus requires a higher response speed. The garbage collection job does not require immediate completion and thus may require a lower response speed. With example implementations of the present disclosure, a corresponding processing device is selected according to the job type 210, so that jobs with different requirements on the response speed may be executed in a more convenient and effective way.

Figure 3:
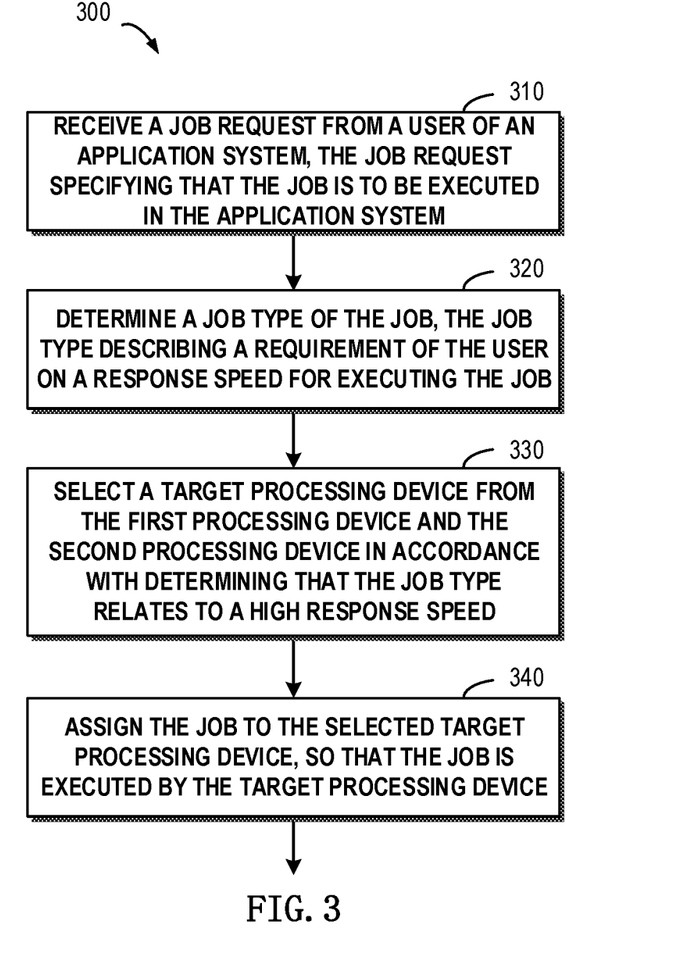
FIG. 3 schematically shows a flowchart of a method for executing a job in an application system according to example implementations of the present disclosure.

More details about example implementations of the present disclosure may be described with reference to FIG. 3. This figure schematically shows a flowchart of a method 300 for executing a job in the application system 120 according to example implementations of the present disclosure. The application system 120 may comprise the first processing device 122 and the second processing device 124. According to example implementations of the present disclosure, the first processing device 122 comprises a QAT-based processing device, and the second processing device 124 comprises a processing device based on a general-purpose processor. The first processing device 122 and the second processing device 124 may have different response speeds, for example, the first processing device 122 may have a first response speed that is lower than a second response speed of the second processing device 124.

At block 310, a job request from a user of the application system 120 may be received, here the job request specifying that the job 110 is to be executed in the application system 120. Specifically, the job may comprise at least one of: a backup job, a recovery job, a copy job and a garbage collection job. It will be understood that the backup job refers to a job for transmitting a generated copy of a user system to the application system 120 so as to perform backup. The recovery job refers to a job for retrieving the copy of the user system from the application system 120 for recovery. The copy job refers to a job for copying data in the application system 120 for data security or other reasons. The garbage collection job refers to a job for collecting storage space which is no longer occupied in the application system 120.

At block 320, the job type 210 of the job may be determined. The job type 210 describes a requirement of the user on the response speed for job execution, and the job type 210 may comprise "a high response speed" and "a low response speed." Here, the high response speed indicates that the user requires the application system 120 to execute the job 110 immediately or in a short time. For example, regarding the backup job, a backup operation usually occurs at night when the workload of the application system is relatively light. In another example, the recovery job needs to be executed when the user system fails, so the recovery job also requires a higher response speed. The low response speed indicates that the user does not require the application system 120 to immediately execute the job 110 but the job 110 may be executed in a long time period or at predetermined time intervals. For example, regarding the copy job and the garbage collection job, they may be executed in the background.

First, description is presented to how to process a job requiring a high response speed. At block 330, in accordance with determining that the job type relates to a high response speed, a target processing device may be selected from the first processing device 122 and the second processing device 124. It will be understood that since such a job type needs to be responded to as soon as possible, a processing device that can give a quick response will be selected from the first processing device 122 and the second processing device 124. It will be understood that although the second processing device 124 may provide a higher response speed, the second processing device 124 may be busy processing other jobs. To call the second processing device 124 will interrupt the original work of the second processing device 124. At this point, it needs to be determined whether the first processing device 122 can meet the requirement of quick response. If the first processing device 122 can meet this requirement, then the first processing device 122 may continue its execution; otherwise, the second processing device 124 will be used to execute the job 110.

Figure 4:
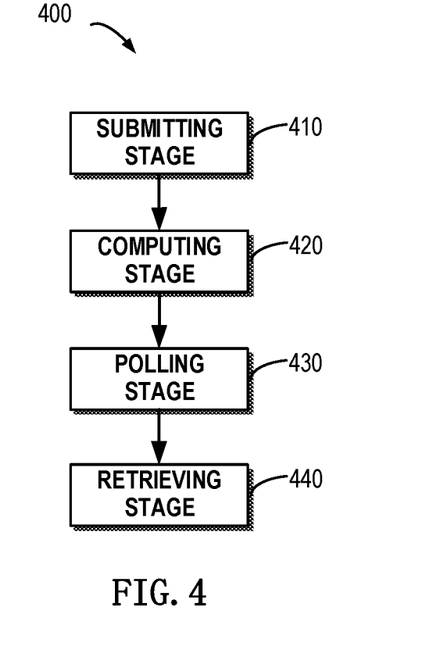
FIG. 4 schematically shows a block diagram of a plurality of stages for executing a job in a first processing device according to example implementations of the present disclosure.

It will be understood that the job execution in the first processing device 122 may involve a plurality of stages, and the overall time of executing the job will comprise time overheads of all the plurality of stages. FIG. 4 schematically shows a block diagram 400 of a plurality of stages of executing a job in the first processing device 122 according to example implementations of the present disclosure. As shown in FIG. 4, the job execution may comprise a submitting stage 410, a computing stage 420, a polling stage 430 and a retrieving stage 440.

In the submitting stage 410, a worker thread of the application system 120 may call an Application Programming Interface (API) at the QAT processor for submitting the job to the QAT processor. Because of conditions of internal locks within the QAT processor, it is necessary to wait for idle resources of the QAT processor in the submitting stage 410, so corresponding submitting time overheads may be produced. In the computing stage 420, the QAT processor actually processes job-related data and leads to corresponding computing time overheads. In the polling stage 430, instances within the QAT processor will be periodically polled so as to determine whether computation is completed, which will result in corresponding polling time overheads. In the retrieving stage 440, the worker thread may be waken so as to retrieve a computation result, which will lead to corresponding retrieving time overheads.

It will be understood that although the job execution may involve the above plurality of stages, only in the computing stage 420, the job-related data is actually processed and a result is obtained. However, time overheads of the other three stages will also affect the overall time of the job execution. According to example implementations of the present disclosure, it may be determined based on the above plurality of stages whether the first processing device 122 can meet the user's requirement on response time. For example, an overhead ratio of the first processing device 122 may be obtained based on the state of the first processing device 122. Here, the overhead ratio may describe the ratio of a plurality of overheads in the plurality of stages that the first processing device 122 executes the job. Next, the target processing device may be selected from the first processing device 122 and the second processing device 124 according to the overhead ratio.

According to example implementations of the present disclosure, a computing overhead and a non-computing overhead used by the first processing device 122 for executing a historical job may be obtained, respectively. Specifically, a current response speed of the first processing device 122 may be measured based on overheads in various stages that the first processing device 122 executes the historical job. For example, state information on the first processing device 122 for executing the historical job in the past 10 minutes or another time period may be collected. Specifically, overheads about a plurality of historical jobs may be collected, for example, the computing overhead and the non-computing overhead may be determined based on averaging. According to example implementations of the present disclosure, the non-computing overhead may be determined based on a submitting overhead in the submitting stage, a polling overhead in the polling stage and a retrieving overhead in the retrieving stage. Furthermore, the overhead ratio may be determined based on the computing overhead and the non-computing overhead.

Specifically, the computing overhead may be determined based on a time overhead in the computing stage 420, and the non-computing overhead may be determined based on overheads in the submitting stage 410, the polling stage 430 and the retrieving stage 440. According to example implementations of the present disclosure, the overhead ratio of the first processing device 122 may further be determined based on related overhead ratios of the plurality of historical jobs.

Furthermore, the overhead ratio may be determined based on Formula 1 as below:

Overhead ratio=non-computing overhead/computing overhead=(submitting overhead+polling overhead+retrieving overhead)/computing overhead   (Formula 1)

It is to be understood that the above Formula 1 is just a schematic example for determining the overhead ratio. According to example implementations of the present disclosure, another formula may be used for determining the overhead ratio. For example, positions of the numerator and the denominator may be swapped to obtain Formula 2 for determining the overhead as below.

Overhead ratio=computing overhead/non-computing overhead=computing overhead/(submitting overhead+polling overhead+retrieving overhead)   (Formula 1)

Figure 5:
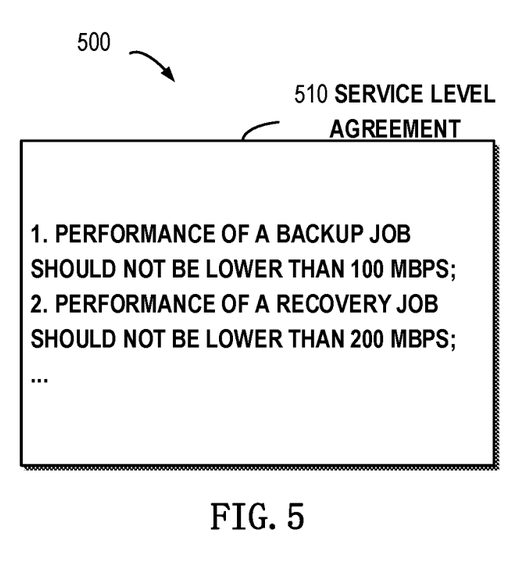
FIG. 5 schematically shows a block diagram of a service level agreement between an application system and a user according to example implementations of the present disclosure.

According to example implementations of the present disclosure, there may exist a service level agreement between the application system 120 and the user, so a service level threshold which the user can bear may be determined based on the service level agreement. FIG. 5 schematically shows a block diagram 500 of a service level agreement 510 between the application system 120 and the user according to example implementations of the present disclosure. As depicted, the service level agreement 510 may comprise requirements on response time for different jobs. For example, the processing performance of the backup job may be required to be no lower than 100 Mbps. In other words, after the user makes a request for a backup job, it should be guaranteed that the data amount of backup data which can be processed per second is not lower than 100 MB. In another example, the processing performance of the recovery job may be required to be no lower than 200 Mbps. That is to say, after the user makes a request for a recovery job, it should be guaranteed that the amount of data which can be returned to the user system per second is not lower than 200 MB.

According to example implementations of the present disclosure, the overhead ratio threshold to be provided by the application system 120 to the user may be determined based on the service level agreement 510 between the user and the application system 120. Generally speaking, the performance of the first processing device 120 actually processing data will be kept within a specific range. Suppose the first processing device 122 can process data of 400 MB at normal runtime. However, due to existence of the non-computing overhead in a plurality of processing stages, the actual processing performance of the first processing device 122 is degraded to some extent.

According to example implementations of the present disclosure, the target processing device may be selected based on the overhead ratio threshold and the overhead ratio. Suppose the overhead ratio is 3:1, i.e., the non-computing overhead is 3 times as large as the computing overhead, then at this point the performance of the first processing device 122 will become 400*1/(1+3)=100 Mbps. Considering that the performance of 100 Mbps can still meet the performance requirement of the backup job, the first processing device 122 may be selected as the target processing device. Nevertheless, the performance of the recovery job is required not to be lower than 200 Mbps, the first processing device 122 cannot process the recovery job.

According to example implementations of the present disclosure, the overhead ratio threshold associated with the job may be determined based on the service level agreement 510. As seen from the above example, when the overhead ratio is 3:1, the performance of the first processing device 122 may meet the lowest performance requirement of the backup job. Therefore, the overhead ratio threshold for the backup job is 3:1. When the overhead ratio is 1:1, the performance of the first processing device 122 is 400*1/(1+1)=200 Mbps. At this point, the performance of the first processing device 122 may meet the lowest performance requirement of the recovery job. Therefore, the overhead ratio threshold for the recovery job is 1:1.

According to example implementations of the present disclosure, the first processing device 122 is selected as the target processing device in accordance with determining that a relationship between the overhead ratio threshold and the overhead ratio meets a first predetermined condition (e.g., the overhead ratio threshold is lower than the overhead ratio). Continuing the above example, when the overhead ratio of the first processing device 122 determined based on the historical job is lower than 3:1, the first processing device 122 may be selected as the target processing device.

According to example implementations of the present disclosure, the second processing device 124 is selected as the target processing device in accordance with determining that a relationship between the overhead ratio threshold and the overhead ratio meets a second predetermined condition (e.g., the overhead ratio threshold is higher than the overhead ratio). Specifically, when the overhead ratio is higher than 3:1, it means that the first processing device 122 fails to meet the lowest performance requirement of the recovery job. At this point, the second processing device 122 may be selected as the target processing device.

Regarding the recovery job, when the overhead ratio is lower than 1:1, the first processing device 122 may be selected as the target processing device. When the overhead ratio is higher than 1:1, the second processing device 124 may be selected as the target processing device. It will be understood that shown above is merely a specific example of a predetermined condition associated with the overhead ratio calculated based on Formula 1. If another formula is used to determine the overhead ratio, the related predetermined condition may vary. For example, when Formula 2 is used to determine the overhead ratio, "higher" in the predetermined condition may be changed to "lower," and "lower" may be changed to "higher."

According to example implementations of the present disclosure, the first processing device 12 is selected as the target device in accordance with determining that the job type is a low response speed. In the example implementations, a job with a lower requirement on the response speed may be directly assigned to the first processing device 122. With example implementations of the present disclosure, the above operation of determining the overhead ratio may be skipped, and the job may be directly assigned to the first processing device 122. In the backup system, the copy job and the garbage collection job may be directly assigned to the first processing device 122.

Figure 6:
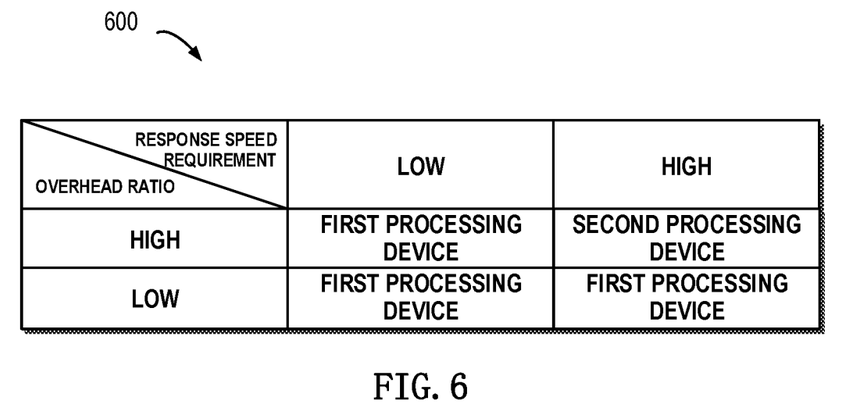
FIG. 6 schematically shows a block diagram of a mapping of relationships between response speed requirements and overhead ratios according to example implementations of the present disclosure.

FIG. 6 schematically shows a block diagram 600 of a mapping of relationships between response speed requirements and overhead ratios according to example implementations of the present disclosure. As depicted, a row in the mapping indicates a requirement of a job on response speed, and a column indicates a determined overhead ratio of the first processing device 122. When a job has a low requirement on the response speed, the job may be directly assigned to the first processing device 122. When a job has a high requirement on the response speed, the target processing device may be selected based on the overhead ratio of the first processing device 122. For example, when the overhead ratio is high, it means that the first processing device 122 has a large latency, so the second processing device 124 may be selected as the target processing device. When the overhead ratio is low, it means that the first processing device 122 has a small latency, so the first processing device 122 may be selected as the target processing device.

Figure 7:
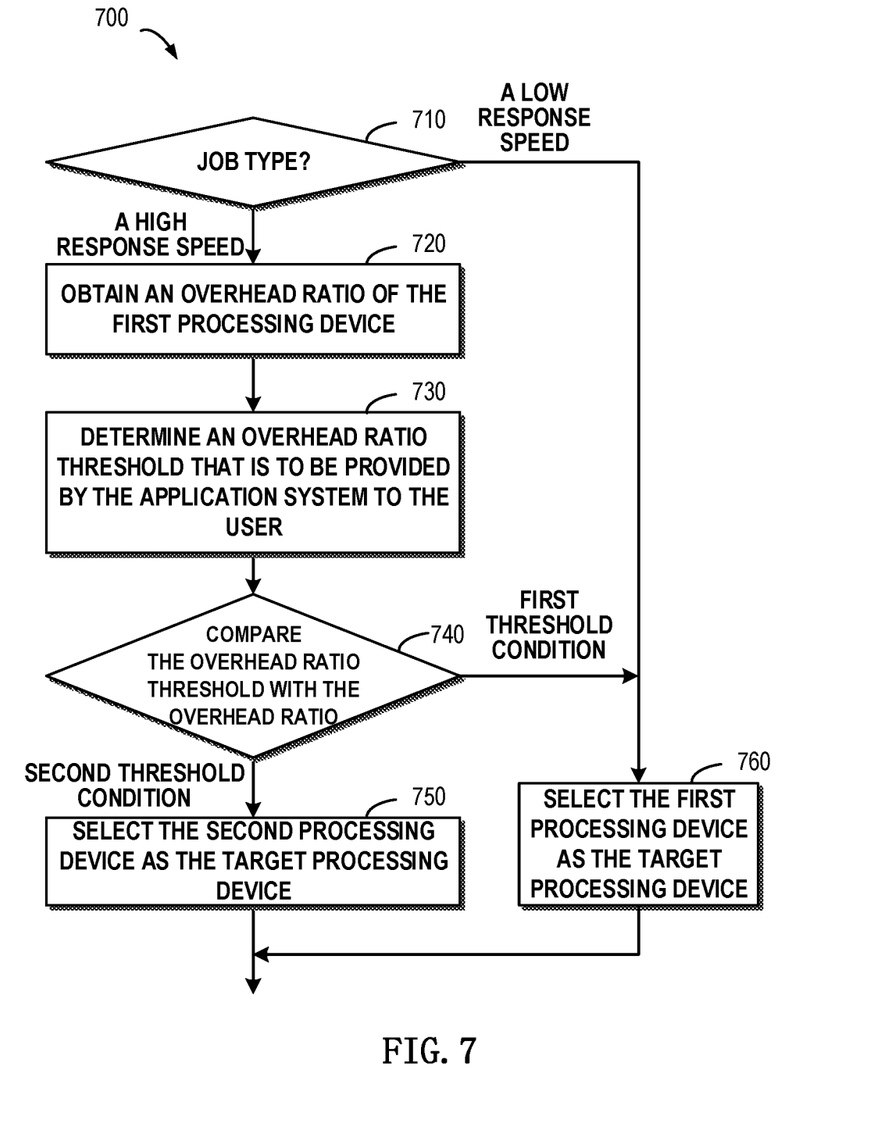
FIG. 7 schematically shows a flowchart of a method for selecting a target processing device from a first processing device and a second processing device according to example implementations of the present disclosure.

More details on how to select a target processing device will be described with reference to FIG. 7. This figure schematically shows a flowchart of a method 700 for selecting a target processing device from the first processing device 122 and the second processing device 124 according to example implementations of the present disclosure. As depicted, at block 710, it may be determined whether the job type relates to a high response speed or a low response speed. If the job requires a lower response speed, then the method 700 proceeds to block 760 so as to select the first processing device 122 as the target processing device. If the job requires a higher response speed, then the method 700 proceeds to block 720 so as to obtain the overhead ratio of the first processing device 122. Then at block 730, the overhead ratio that is to be provided by the application system to the user may be determined. Specifically, the overhead ratio threshold may be determined according to the method described with reference to FIG. 5.

At block 740, a comparison may be made between the overhead ratio threshold and the overhead ratio. If the relationship between them meets the first predetermined condition, it means that the performance of the first processing device 122 may meet the requirement in the service level agreement. The method 700 then proceeds to block 760 so as to select the first processing device 122 as the target processing device. If the relationship meets the second predetermined condition, it means that the performance of the first processing device 122 does not meet the requirement in the service level agreement. Thus, the method 700 proceeds to block 750 so as to select the second processing device 124 as the target processing device.

Returning to FIG. 3, at block 340, the job may be assigned to the selected target processing device, so that the job may be executed by the selected target processing device. In this way, a processing device that can meet the user's requirement on response speed may be selected to execute the job.

It will be understood that although example implementations of the present disclosure have been described by using the backup system as an example of the application system, here the application system may comprise other types of application systems. For example, the application system may be a multimedia service system, and the user may upload a multimedia file to the multimedia service system and download a multimedia file from the same. At this point, regarding a job of uploading type, it may be considered that the job requires a lower response speed; also, it may be considered that a job of online viewing type requires a higher response speed. At this point, an uploading job may be directly dispatched to the first processing device 122. Regarding online viewing, the overhead ratio of the first processing device 122 may be determined first, and then the target processing device may be selected for providing the online viewing from the first processing device 122 and the second processing device 124 based on the overhead ratio.

While examples of the method according to the present disclosure have been described in detail with reference to FIGS. 2 to 7, description is presented below for the implementation of a corresponding apparatus. According to example implementations of the present disclosure, an apparatus is provided for executing a job in an application system, the application system comprising a first processing device and a second processing device, a first response speed of the first processing device being lower than a second response speed of the second processing device. The apparatus comprises: a receiving module configured to receive a job request from a user of the application system, the job request specifying that the job is to be executed in the application system; a determining module configured to determine a job type of the job, the job type describing a requirement of the user on a response speed for executing the job; a selecting module configured to select a target processing device from the first processing device and the second processing device in accordance with determining that the job type relates to a high response speed; and an assigning module configured to assign the job to the selected target processing device, so that the job is executed by the target processing device.

According to example implementations of the present disclosure, the selecting module comprises: a ratio obtaining module configured to obtain an overhead ratio of the first processing device based on a state of the first processing device, the overhead ratio describing a ratio of a plurality of overheads in a plurality of stages that the first processing device executes the job; and a device selecting module configured to select the target processing device from the first processing device and the second processing device according to the overhead ratio.

According to example implementations of the present disclosure, the ratio obtaining module comprises: an overhead obtaining module configured to obtain a computing overhead and a non-computing overhead caused by the first processing device for executing a historical job, respectively; and a computing module configured to determine the overhead ratio based on the computing overhead and the non-computing overhead.

According to example implementations of the present disclosure, the overhead obtaining module is configured to determine the non-computing overhead based on an overhead in a submitting stage, an overhead in a polling stage and an overhead in a retrieving stage when the first processing device executes the historical job.

According to example implementations of the present disclosure, the device selecting module comprises: a threshold determining module configured to determine an overhead ratio threshold that is to be provided by the application system to the user based on a service level agreement between the user and the application system; and a target processing device selecting module configured to select the target processing device based on the overhead ratio threshold and the overhead ratio.

According to example implementations of the present disclosure, the target processing device selecting module comprises: a first selecting module configured to select the first processing device as the target processing device in accordance with determining that a relationship between the overhead ratio threshold and the overhead ratio meets a first predetermined condition.

According to example implementations of the present disclosure, the target processing device selecting module comprises: a second selecting module configured to select the second processing device as the target processing device in accordance with determining that a relationship between the overhead ratio threshold and the overhead ratio meets a second predetermined condition.

According to example implementations of the present disclosure, the selecting module is further configured to select the first processing device as the target device in accordance with determining that the job type relates to a low response speed.

According to example implementations of the present disclosure, the application system comprises a data backup system; and the job comprises at least one of: a backup job, a recovery job, a copy job and a garbage collection job, job types of the backup job and the recovery job relating to the high response speed, and job types of the copy job and the garbage collection job relating to the low response speed.

According to example implementations of the present disclosure, the first processing device comprises a processing device based on Quick Assist Technology, and the second processing device comprises a processing device based on a general-purpose processor.

Figure 8:
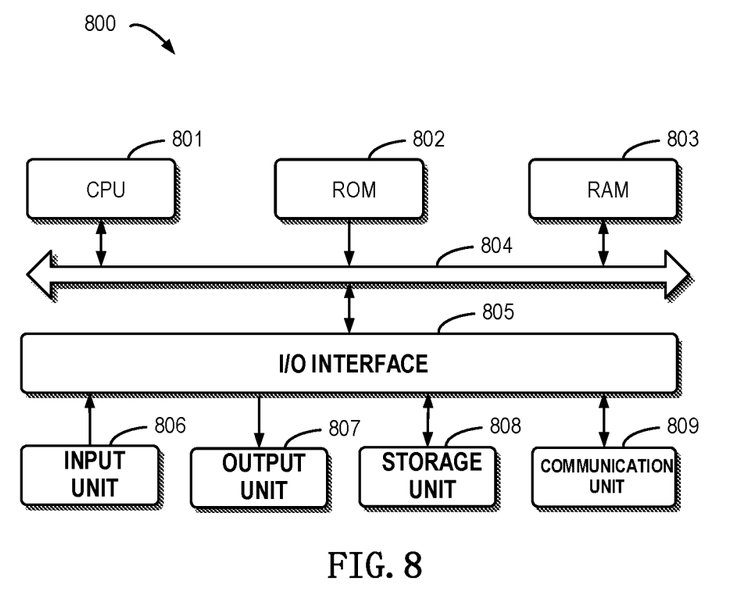
FIG. 8 schematically shows a block diagram of a device for managing a backup system according to example implementations of the present disclosure.

FIG. 8 schematically shows a block diagram of a device 800 for executing a job in an application system according to example implementations of the present disclosure. As depicted, the device 800 includes a central processing unit (CPU) 801, which can execute various suitable actions and processing based on the computer program instructions stored in the read-only memory (ROM) 802 or computer program instructions loaded in the random-access memory (RAM) 803 from a storage unit 808. The RAM 803 can also store all kinds of programs and data required by the operations of the device 800. CPU 801, ROM 802 and RAM 803 are connected to each other via a bus 804. The input/output (I/O) interface 805 is also connected to the bus 804.

A plurality of components in the device 800 are connected to the I/O interface 805, including: an input unit 806, such as a keyboard, mouse and the like; an output unit 807, e.g., various kinds of displays and loudspeakers etc.; a storage unit 808, such as a magnetic disk and optical disk, etc.; and a communication unit 809, such as a network card, modem, wireless transceiver and the like. The communication unit 809 allows the device 800 to exchange information/data with other devices via the computer network, such as Internet, and/or various telecommunication networks.

The above described process and treatment, such as the methods 300 and 700 can also be executed by the processing unit 801. For example, in some implementations, the methods 300 and 700 can be implemented as a computer software program tangibly included in the machine-readable medium, e.g., the storage unit 808. In some implementations, the computer program can be partially or fully loaded and/or mounted to the device 800 via ROM 802 and/or the communication unit 809. When the computer program is loaded to the RAM 803 and executed by the CPU 801, one or more steps of the above described methods 300 and 700 can be implemented. Alternatively, in other implementations, the CPU 801 can also be configured in other suitable ways to realize the above procedure/method.

According to example implementations of the present disclosure, an electronic device is provided, the electronic device comprising: at least one processor; and a memory coupled to the at least one processor, the memory having instructions stored thereon, the instructions, when executed by the at least one processor, causing the device to perform acts for executing a job in an application system. The application system comprises a first processing device and a second processing device, a first response speed of the first processing device being lower than a second response speed of the second processing device. The acts comprise: receiving a job request from a user of the application system, the job request specifying that the job is to be executed in the application system; determining a job type of the job, the job type describing a requirement of the user on a response speed for executing the job; selecting a target processing device from the first processing device and the second processing device in accordance with determining that the job type relates to a high response speed; and assigning the job to the selected target processing device, so that the job is executed by the target processing device.

According to example implementations of the present disclosure, selecting the target processing device from the first processing device and the second processing device in accordance with determining that the job type relates to the high response speed comprises: obtaining an overhead ratio of the first processing device based on a state of the first processing device, the overhead ratio describing a ratio of a plurality of overheads in a plurality of stages that the first processing device executes the job; and selecting the target processing device from the first processing device and the second processing device according to the overhead ratio.

According to example implementations of the present disclosure, obtaining the overhead ratio of the first processing device comprises: obtaining a computing overhead and a non-computing overhead caused by the first processing device for executing a historical job, respectively; and determining the overhead ratio based on the computing overhead and the non-computing overhead.

According to example implementations of the present disclosure, obtaining the non-computing overhead of the first processing device comprises: determining the non-computing overhead based on an overhead in a submitting stage, an overhead in a polling stage and an overhead in a retrieving stage when the first processing device executes the historical job.

According to example implementations of the present disclosure, selecting the target processing device from the first processing device and the second processing device according to the overhead ratio comprises: determining an overhead ratio threshold that is to be provided by the application system to the user based on a service level agreement between the user and the application system; and selecting the target processing device based on the overhead ratio threshold and the overhead ratio.

According to example implementations of the present disclosure, selecting the target processing device based on the overhead ratio threshold and the overhead ratio comprises: selecting the first processing device as the target processing device in accordance with determining that a relationship between the overhead ratio threshold and the overhead ratio meets a first predetermined condition.

According to example implementations of the present disclosure, selecting the target processing device based on the overhead ratio threshold and the overhead ratio comprises: selecting the second processing device as the target processing device in accordance with determining that a relationship between the overhead ratio threshold and the overhead ratio meets a second predetermined condition.

According to example implementations of the present disclosure, the acts further comprise: selecting the first processing device as the target device in accordance with determining that the job type relates to a low response speed.

According to example implementations of the present disclosure, the application system comprises a data backup system; and the job comprises at least one of: a backup job, a recovery job, a copy job and a garbage collection job, job types of the backup job and the recovery job relating to the high response speed, and job types of the copy job and the garbage collection job relating to a low response speed.

According to example implementations of the present disclosure, the first processing device comprises a processing device based on Quick Assist Technology, and the second processing device comprises a processing device based on a general-purpose processor.

According to example implementations of the present disclosure, there is provided a computer program product. The computer program product is tangibly stored on a non-transitory computer-readable medium and comprises machine-executable instructions which are used to implement the method according to the present disclosure.

According to example implementations of the present disclosure, there is provided a computer-readable medium. The computer-readable medium has machine-executable instructions stored thereon, the machine-executable instructions, when executed by at least one processor, causing the at least one processor to implement the method according to the present disclosure.

The present disclosure can be a method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but is not limited to, an electrical storage device, magnetic storage device, optical storage device, electromagnetic storage device, semiconductor storage device or any appropriate combination of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combination of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combination of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where a remote computer is involved, the remote computer can be connected to the user computer via any type of network, including local area network (LAN) and wide area network (WAN), or to the external computer (e.g., connected via Internet using an Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow charts and/or block diagrams of method, apparatus (system) and computer program products according to implementations of the present disclosure. It should be understood that each block of the flow charts and/or block diagrams and the combination of various blocks in the flow charts and/or block diagrams can be implemented by computer-readable program instructions.

The computer-readable program instructions can be provided to the processing unit of a general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular way, such that the computer-readable medium stored with instructions contains an article of manufacture, including instructions for implementing various aspects of the functions/actions stipulated in one or more blocks of the flow chart and/or block diagram.

The computer-readable program instructions can also be loaded into a computer, other programmable data processing apparatuses or other devices, so as to execute a series of operation steps on the computer, the other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow charts and block diagrams in the drawings illustrate system architecture, functions and operations that may be implemented by system, method and computer program products according to a plurality of implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order depending on the functions involved. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable others of ordinary skill in the art to understand implementations of the present disclosure.

We claim:

1. A method for executing a job, the method comprising:
receiving a job request from a user of an application system, the job request specifying that the job is to be executed in the application system, wherein the application system includes a first processing device and a second processing device, and wherein a first response speed of the first processing device is lower than a second response speed of the second processing device;
determining a job type of the job, the job type describing a requirement of the user on a response speed for executing the job;
selecting a target processing device from the first processing device and the second processing device in accordance with determining that the job type relates to a high response speed according to an overhead ratio describing a ratio of a plurality of overheads in a plurality of stages that the first processing device executes the job; and
assigning the job to the selected target processing device, so that the job is executed by the target processing device.

2. The method of claim 1, wherein selecting the target processing device from the first processing device and the second processing device in accordance with determining that the job type relates to the high response speed comprises:
obtaining the overhead ratio of the first processing device based on a state of the first processing device.

3. The method of claim 2, wherein obtaining the overhead ratio of the first processing device comprises:
obtaining a computing overhead and a non-computing overhead caused by the first processing device for executing a historical job, respectively; and
determining the overhead ratio based on the computing overhead and the non-computing overhead.

4. The method of claim 3, wherein obtaining the non-computing overhead of the first processing device comprises:
determining the non-computing overhead based on an overhead in a submitting stage, an overhead in a polling stage and an overhead in a retrieving stage when the first processing device executes the historical job.

5. The method of claim 3, wherein selecting the target processing device from the first processing device and the second processing device according to the overhead ratio comprises:
determining an overhead ratio threshold that is to be provided by the application system to the user based on a service level agreement between the user and the application system; and
selecting the target processing device based on the overhead ratio threshold and the overhead ratio.

6. The method of claim 5, wherein selecting the target processing device based on the overhead ratio threshold and the overhead ratio comprises:
selecting the first processing device as the target processing device in accordance with determining that a relationship between the overhead ratio threshold and the overhead ratio meets a first predetermined condition.

7. The method of claim 5, wherein selecting the target processing device based on the overhead ratio threshold and the overhead ratio comprises:
selecting the second processing device as the target processing device in accordance with determining that a relationship between the overhead ratio threshold and the overhead ratio meets a second predetermined condition.

8. The method of claim 1, further comprising:
selecting the first processing device as the target device in accordance with determining that the job type relates to a low response speed.

9. The method of claim 1, wherein:
the application system comprises a data backup system; and
the job comprises at least one of: a backup job, a recovery job, a copy job and a garbage collection job, job types of the backup job and the recovery job relating to the high response speed, and job types of the copy job and the garbage collection job relating to a low response speed.

10. The method of claim 1, wherein the first processing device comprises a processing device based on Quick Assist Technology, and the second processing device comprises a processing device based on a general-purpose processor.

11. An electronic device, comprising:
at least one processor; and
a memory coupled to the at least one processor, the memory having instructions stored thereon, which when executed by the at least one processor, cause the electronic device to perform acts for executing a job, the acts comprising:
receiving a job request from a user of an application system, the job request specifying that the job is to be executed in the application system, wherein the application system includes a first processing device and a second processing device, and wherein a first response speed of the first processing device is lower than a second response speed of the second processing device;
determining a job type of the job, the job type describing a requirement of the user on a response speed for executing the job;
selecting a target processing device from the first processing device and the second processing device in accordance with determining that the job type relates to a high response speed according to an overhead ratio describing a ratio of a plurality of overheads in a plurality of stages that the first processing device executes the job; and
assigning the job to the selected target processing device, so that the job is executed by the target processing device.

12. The device of claim 11, wherein selecting the target processing device from the first processing device and the second processing device in accordance with determining that the job type relates to the high response speed comprises:
obtaining an overhead ratio of the first processing device based on a state of the first processing device.

13. The device of claim 12, wherein obtaining the overhead ratio of the first processing device comprises:
obtaining a computing overhead and a non-computing overhead caused by the first processing device for executing a historical job, respectively; and
determining the overhead ratio based on the computing overhead and the non-computing overhead.

14. The device of claim 13, wherein obtaining the non-computing overhead of the first processing device comprises:

determining the non-computing overhead based on an overhead in a submitting stage, an overhead in a polling stage and an overhead in a retrieving stage when the first processing device executes the historical job.

15. The device of claim 13, wherein selecting the target processing device from the first processing device and the second processing device according to the overhead ratio comprises:
    determining an overhead ratio threshold that is to be provided by the application system to the user based on a service level agreement between the user and the application system; and
    selecting the target processing device based on the overhead ratio threshold and the overhead ratio.

16. The device of claim 15, wherein selecting the target processing device based on the overhead ratio threshold and the overhead ratio comprises:
    selecting the first processing device as the target processing device in accordance with determining that a relationship between the overhead ratio threshold and the overhead ratio meets a first predetermined condition.

17. The device of claim 15, wherein selecting the target processing device based on the overhead ratio threshold and the overhead ratio comprises:
    selecting the second processing device as the target processing device in accordance with determining that a relationship between the overhead ratio threshold and the overhead ratio meets a second predetermined condition.

18. The device of claim 11, wherein the acts further comprise:
    selecting the first processing device as the target device in accordance with determining that the job type relates to a low response speed.

19. The device of claim 11, wherein:
    the application system comprises a data backup system; and
    the job comprises at least one of: a backup job, a recovery job, a copy job and a garbage collection job, job types of the backup job and the recovery job relating to the high response speed, and job types of the copy job and the garbage collection job relating to a low response speed.

20. A computer program product, tangibly stored on a non-transitory computer-readable medium and comprising machine-executable instructions, which when executed by a processor, cause the processor to perform acts of executing a job, the acts comprising:
    receiving a job request from a user of an application system, the job request specifying that the job is to be executed in the application system, wherein the application system includes a first processing device and a second processing device, and wherein a first response speed of the first processing device is lower than a second response speed of the second processing device;
    determining a job type of the job, the job type describing a requirement of the user on a response speed for executing the job;
    selecting a target processing device from the first processing device and the second processing device in accordance with determining that the job type relates to a high response speed according to an overhead ratio describing a ratio of a plurality of overheads in a plurality of stages that the first processing device executes the job; and
    assigning the job to the selected target processing device, so that the job is executed by the target processing device.

* * * * *